United States Patent [19]

Belk

[11] Patent Number: 4,771,870
[45] Date of Patent: Sep. 20, 1988

[54] BRAKE SHOE ASSEMBLY

[75] Inventor: George L. Belk, Aurora, Ill.

[73] Assignee: Maron Products, Inc., Mishawaka, Ind.

[21] Appl. No.: 804,166

[22] Filed: Dec. 3, 1985

[51] Int. Cl.$^4$ .............................................. F16D 69/00
[52] U.S. Cl. .............................. 188/250 D; 188/250 C; 188/234
[58] Field of Search ............ 188/250 B, 250 A, 250 C, 188/250 D, 250 E, 250 F, 250 G, 234, 236, 242, 244, 245, 247, 330, 79; 192/107 T

[56]  References Cited
U.S. PATENT DOCUMENTS

| | | | |
|---|---|---|---|
| 1,724,053 | 8/1929 | Thompson | 188/234 |
| 1,919,974 | 7/1933 | Blume | 188/250 F |
| 2,040,551 | 5/1936 | Green | |
| 2,148,257 | 2/1939 | Budd | |
| 2,598,545 | 5/1952 | House | 188/234 |
| 2,722,293 | 11/1955 | Sykes | |
| 2,723,016 | 11/1955 | Goldberg | 192/107 T |
| 2,928,510 | 3/1960 | Kay | |
| 3,265,166 | 8/1966 | Lavengood | |
| 3,398,814 | 8/1968 | Deibel | 188/234 X |
| 3,467,229 | 9/1969 | Deibel | |
| 3,650,360 | 3/1972 | King et al. | 188/250 C |
| 3,998,300 | 12/1976 | Sullivan | |
| 4,473,140 | 9/1984 | Komori | |
| 4,546,862 | 10/1985 | Shellhause | |
| 4,569,424 | 2/1986 | Taylor, Jr. | |

Primary Examiner—Douglas C. Butler
Assistant Examiner—Alvin Oberley
Attorney, Agent, or Firm—Barnes & Thornburg

[57]  ABSTRACT

A brake shoe assembly for a vehicle includes a generally arcuate platform, to which a pad of friction lining is attached, and which is selectively connectable to a pair of supporting webs. Each web has a plurality of radially extending peripheral projections received by corresponding slots provided in the platform. Clamp members are provided for pressing the webs against the platform such that the projections and slots cooperate to locate the webs immovably on the platform. The platform and friction lining may thereby be removed from the webs while the webs remain installed within the brake drum of the vehicle.

5 Claims, 2 Drawing Sheets

BRAKE SHOE ASSEMBLY

BACKGROUND OF THE INVENTION

1. Field of the Invention

The present invention relates to vehicle brake shoes of the type suitable for use with a drum brake system and, more particularly, to an improved brake shoe assembly which facilitates the replacement of the shoe lining without complete removal of the shoe assembly from mounted installation within the drum.

2. Description of the Prior Art

Conventional drum brake systems employ generally arcuate brake shoes mounted within a drum and connected to a bell crank actuator mechanism which forces the shoes into frictional contact with the inner surface of the drum when braking of the vehicle is desired. In many applications, such as semi-trailers, for example, the brake shoe comprises a pad of friction material riveted to a platform member which in turn is welded to a pair of webs. The webs are configured to support the shoe about the axle of the vehicle for pivotal movement by the bell crank actuator mechanism. Frequently, in such an application, the inboard side of the drum is protected by a removable inspection cover, or dust plate, permitting accessibility to the brake shoe components. However, when the brake shoe linings become worn and require replacement, the shoes cannot be removed from the inboard side of the drum. Instead, the vehicle must be placed on a jack, the wheel or wheels must be dismounted from the drum, the drum and wheel bearings must be removed from the axle, and the brake shoes together with their mounting hardware must be dismounted from the axle. The foregoing brake service procedure is not only time consuming, particularly with dual wheel vehicles, it is accompanied by possible risk of damage to the oil seals which protect the wheel bearings. As a consequence, the procedure involves considerable skill.

To minimize the time and expense associated with replacing brake shoes by conventional procedures, a type of brake shoe assembly is known wherein the lining may be disassociated from the brake shoe platform and webs. Such a shoe assembly is disclosed, for example, in U.S. Pat. No. 3,941,222, issued to Newstead on Mar. 2, 1976. In such a shoe assembly, the lining is bonded to a backing plate having a plurality of tongues which detachably cooperate with corresponding slots in the brake shoe platform to permit the liing to be selectively attached and detached from the shoe, allowing the brake linings to be renewed without removal of the entire shoe from mounted condition with respect to the axle. However, known shoe assemblies of the foregoing type involve the disadvantage that the lining is not firmly secured to the shoe platform and can, with use, become detached from the shoe. In addition, when brake shoes having detachable linings are to be renewed, the brake drum must, in the usual case, be removed because sufficient clearance is not available to disassociate the lining from the shoe with the shoe assembly installed within the drum. Therefore, it would be desirable to provide a shoe assembly having a replaceable lining which is securely fixed to the shoe but is conveniently removable from the shoe through the dust cover, or inboard side of the wheel assembly.

SUMMARY OF THE INVENTION

It is therefore an object of this invention to provide a brake shoe assembly which will overcome the abovedescribed disadvantages of the prior art and will allow the brake linings of the shoe to be readily replaced without dismounting of the complete shoe assembly from the axle of a vehicle. In accordance with the invention, there is provided a generally arcuate platform having an outer side which supports a pad of friction material. A pair of generally arcuate webs having a plurality of radially extending projections are disposed against the inner side of the platform with the projections cooperating with corresponding slots formed in the inner side of the platform. The webs and platform are held together by clamp means comprising a plate member configured to span the space between the webs and a bolt which is threadedly received by a nut provided on the carrier. By such an arrangement, the platform may be selectively disassociated from the webs by unbolting of the clamp means and thereafter separating the web projections from the slots provided in the platform. Since the web projections need to extend only slightly from the webs to provide a secure connection with a lining platform, the lining platform may be completely disassociated from the web members while the webs remain installed within the drum of the vehicle because adequate clearance is usually available between the lining and drum to permit the web projections to clear their respective slots. Accordingly, when used in a brake assembly of a semi-trailer, for example, the brake linings of the instant invention may be removed and replaced from the inboard side of the wheel assembly without removal of the wheels and drum.

BRIEF DESCRIPTION OF THE DRAWING

The present invention will be better understood from the following description of a preferred embodiment thereof taken in connection with the accompanying drawing in which.

DETAILED DESCRIPTION OF THE PREFERRED EMBODIMENTS

Figure 1:
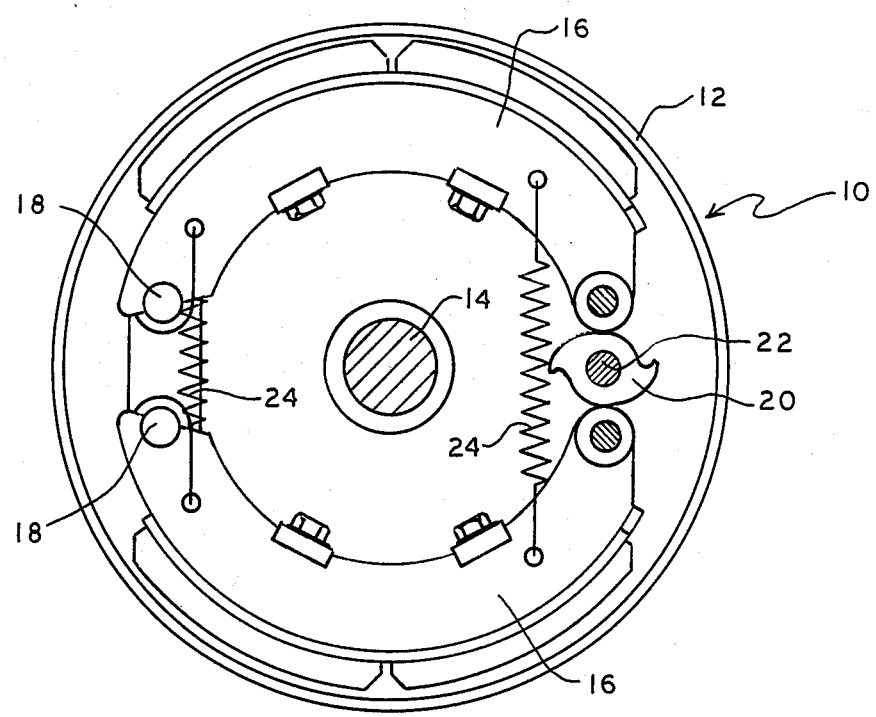
FIG. 1 is a rear-elevational view of a brake shoe and drum assembly illustrating a pair of shoe assemblies in accordance with the present invention.

Referring initially to FIG. 1, a brake shoe assembly, designated generally by the reference numeral 10 includes a brake drum 12 mounted for rotational movement on an axle 14. Positioned within the drum 12 and mounted to the axle housing (not shown) in a manner well known in the art are a pair of brake shoe assemblies 16, 16. The shoes 16, 16 are generally arcuate in configuration and each shoe assembly 16 has one end disposed against a pivot member 18 with the opposite end connected to a cam assembly 20. A cam actuating rod 22 connected to a bell crank mechanism (not shown) rotates the cam assembly, thereby causing the brake shoe assemblies 16, 16 to expand outwardly from one another into contact with the drum 12. A pair of springs 24, 24 are provided for retaining the shoes 16, 16 in a normally disengaged disposition with respect to the drum 12.

Figure 2:
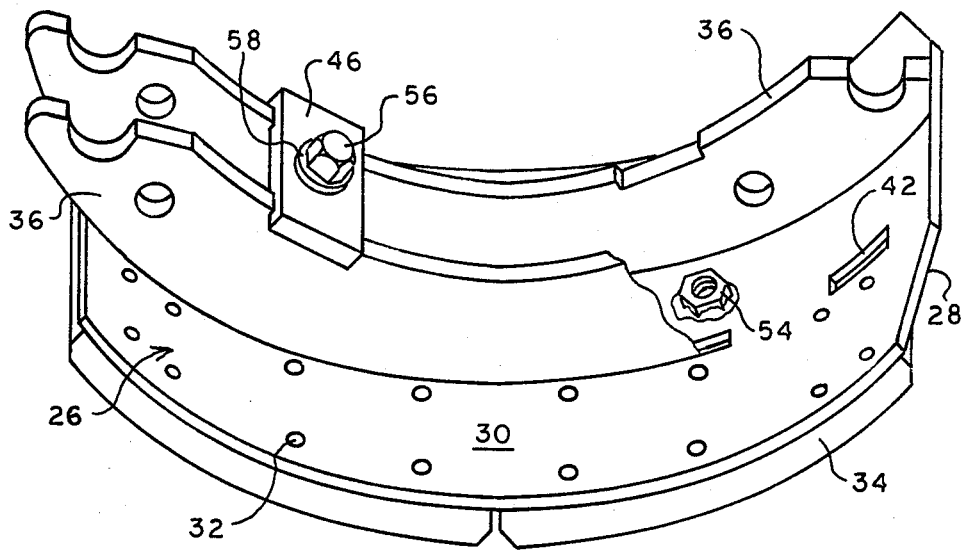
FIG. 2 is a perspective view on an enlarged scale of a brake shoe assembly in accordance with the present invention.

Turning to FIG. 2, the brake shoe assembly 16 can be seen to include a platform 26 having a generally arcuate shape corresponding to the diameter of the brake drum 12 thereby defining an outer surface 28 and an inner surface 30. Secured to the outer surface 28 of the platform 26 by a plurality of rivets 32 are one or more pads of friction material or lining 34. A pair of webs 36, 36 having a generally arcuate configuration corresponding to the shape of the platform 26 are spaced in parallel relation one to another against the inner surface 30 of the platform 26.

Figure 3:
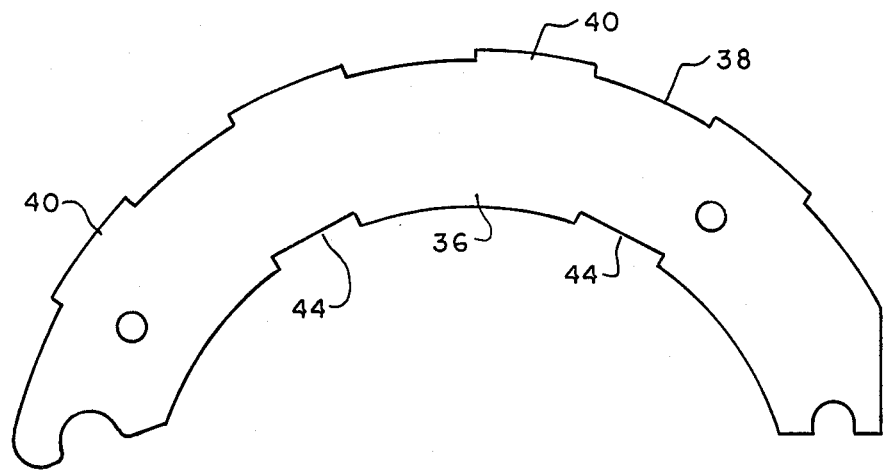
FIG. 3 is an elevational view of a brake shoe web member in accordance with the present invention.

From FIGS. 2 and 3, each web 36 can be seen to comprise a stamped and formed member having a generally circular peripheral edge 38 from which a plurality of spaced circumferential projections extend radially outwardly. The projections 40 correspond in number and spacing to a plurality of elongate slots 42 provided in the inner surface 30 of the platform 26. The slots 42 and projections 40 cooperate to immovably locate the webs in proper orientation with respect to the platform 26. A pair of recesses 44, 44 are provided along the edge of the web opposite peripheral edge 38.

Figure 4:
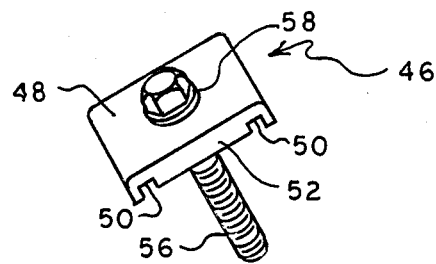
FIG. 4 is a perspective view of a clamp member for use with the brake shoe assembly of the instant invention.

In order to secure the webs 36, 36 firmly to the platform 26, and as best seen in FIG. 4, the brake shoe assembly 16 includes a pair of clamps designated generally by the reference numeral 46. Each clamp 46 comprises a generally rectangular plate 48 having a pair of slots 50 which together define an intermediate spacer portion 52 therebetween. In an installed condition, the slot 50, 50 of the plate 48 are each received by a respective recess 44 of the webs 36, 36 and the intermediate spacer portion 52 serves to maintain the webs 36, 36 in spaced parallel relation one to another. Between the webs 36, 36 and preferrably welded to the inner surface 30 of the platform 26 are a pair of nuts 54, only one of which can be seen, located in alignment with the center line of each clamp 46. Each nut 54 threadedly receives a corresponding bolt 56 extending through the center of each clamp 46. As the bolts 56 are drawn down on the clamps 46, 46, the webs 36, 36 are pressed into the secured engagement with the platform 26 thereby producing a unitary brake shoe assembly 16. Suitable lock washers 58 may be provided to maintain the bolts 56 immovable against the effects of vibration.

Although the assembly 16 is shown as employing conventional bolts 56 which are threadedly received by nuts 54, an alternative structure for retaining the webs 36, 36 to the platform 26 may be provided wherein the platform 26 is formed with a pair of slots (not shown) at the location of the nuts 54. By such an arrangement, a bolt having a T-shaped head may be inserted into the slot and rotated through 90 degrees to provide another means for drawing the clamps 46 into secure engagement with the webs 36, 36. The latter structure avoids the step of welding nuts 54 to the platform 26 in manufacture of the brake shoe assembly 16.

It can be appreciated that when the brake shoe assembly is installed in mounted configuration within the drum, the platform 26 and lining 34 may be readily removed and replaced by simply unbolting the two clamps 46, 46 and manually separating the plateform 26 from the webs 36, 36. Because the projections 40 of the webs 36 are of minimal radial dimension, they can be released from their corresponding slots 42 of the platform 26 with minimal clearance between the lining 34 and the drum 12. As a consequence, new linings 34 may be installed on the shoe assembly 16 without removal of the webs 36, 36 from their installed condition on the housing of the vehicle axle. Moreover, in a vehicle having a dust cover protecting the inner side of the drum and brake assembly, the platform 26 and lining 34 may be readily removed and replaced from the dust cover side of the drum without jacking of the vehicle and removal of the wheel and drum assemblies.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

I claim:

1. A brake shoe assembly cooperable with a brake drum of a vehicle comprising:
    a generally arcuate platform having an outer side and an inner side,
    a pad of friction material secured to the outer side of said platform,
    a pair of generally arcuate webs disposed in spaced parallel relation one to another, each web having an outer edge and an inner edge, said outer edges being disposed against the inner side of said platform,
    a plurality of circumferential slots formed in said platform,
    a plurality of circumferential radially extending projections formed on said outer edges of said webs for cooperation with said slots to prevent relative movement between said platform and said webs,
    a plate member spanning said webs and bearing against said inner edges thereof, and
    bolt means cooperable between said platform and said plate member to draw said platform generally radially of said webs to retain said platform to said webs,
    whereby said platform may be manually detached from said webs and removed from mounted position within said drum without removal of said webs therefrom.

2. The brake shoe assembly of claim 1 wherein said plate member is provided with a pair of slots and said inner edges of said webs are each provided with a recess, said plate member slots and said recesses being cooperable to immovably position said plate member on said webs.

3. The brake shoe assembly of claim 2 wherein said plate member slots define an intermediate spacer member which serves to maintain said webs in parallel spaced relation one to another.

4. The brake shoe assembly of claim 1 wherein said inner side of said platform is provided with a nut positioned centrally of said webs and said bolt means is threadedly received by said nut to draw said platform into engagement with said webs.

5. The brake shoe assembly of claim 1 wherein said bolt means includes a T-shaped head and said head is removably receivable by a slot in said platform, said platform slot being positioned centrally of said webs, whereby said bolt means may be rotated in said platform slot to provide a connection between said platform and said bolt means.

* * * * *

UNITED STATES PATENT AND TRADEMARK OFFICE
CERTIFICATE OF CORRECTION

PATENT NO. : 4,771,870

DATED : September 20, 1988

INVENTOR(S) : George L. Belk

It is certified that error appears in the above-identified patent and that said Letters Patent is hereby corrected as shown below:

In Column 1, line 51, please delete "liing" and insert therefor --lining--.

In Column 2, line 4 and 5, please delete "abovede" and insert therefor --above-described--.

In Column 3, line 63, please delete "plateform" and insert therefor --platform--.

Signed and Sealed this

Twenty-first Day of March, 1989

Attest:

DONALD J. QUIGG

Attesting Officer

Commissioner of Patents and Trademarks